(12) United States Patent
Seo (10) Patent No.: US 8,914,082 B2
(45) Date of Patent: Dec. 16, 2014

(54) MOBILE TERMINAL AND METHOD OF OPERATING ANTENNA THEREOF

(75) Inventor: Sung In Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 369 days.

(21) Appl. No.: 12/928,211

(22) Filed: Dec. 7, 2010

(65) Prior Publication Data

US 2011/0136458 A1 Jun. 9, 2011

(30) Foreign Application Priority Data

Dec. 7, 2009 (KR) ........................ 10-2009-0120360

(51) Int. Cl.
| | |
|---|---|
| *H04M 1/00* | (2006.01) |
| *H01Q 9/14* | (2006.01) |
| *H01Q 1/24* | (2006.01) |
| *H04B 7/06* | (2006.01) |
| *H01Q 21/28* | (2006.01) |
| *H04B 7/08* | (2006.01) |
| *H04B 7/10* | (2006.01) |
| *H04B 7/12* | (2006.01) |

(52) U.S. Cl.
CPC ............ *H04B 7/0693* (2013.01); *H04B 7/0825* (2013.01); *H01Q 9/14* (2013.01); *H01Q 1/243* (2013.01); *H04B 7/10* (2013.01); *H04B 7/0691* (2013.01); *H04B 7/12* (2013.01); *H01Q 21/28* (2013.01)
USPC ........ 455/575.7; 455/101; 455/333; 455/334; 455/550.1; 343/853; 343/893

(58) Field of Classification Search
CPC ......... H01Q 1/243; H01Q 1/24; H01Q 1/242; H01Q 1/246; H01Q 21/0006; H01Q 21/065; H01Q 21/08
USPC ............... 455/77–79, 82, 101, 313, 323, 333, 455/334, 550.1, 561, 562.1, 575.1, 575.7; 343/850, 853, 876, 893
See application file for complete search history.

(56) References Cited

U.S. PATENT DOCUMENTS

| | | | |
|---|---|---|---|
| 7,194,284 B2 * | 3/2007 | Rousu ........................ 455/553.1 |
| 7,873,330 B2 * | 1/2011 | Tudosoiu et al. ............... 455/73 |
| 8,219,165 B2 * | 7/2012 | Kikuchi et al. ............ 455/575.7 |
| 8,249,678 B2 * | 8/2012 | Abe et al. .................... 455/575.5 |
| 2008/0129639 A1 * | 6/2008 | Mitsugi ......................... 343/876 |
| 2008/0143614 A1 * | 6/2008 | Park et al. ..................... 343/702 |
| 2008/0261550 A1 * | 10/2008 | Yamaguchi ................... 455/272 |
| 2010/0285836 A1 * | 11/2010 | Horihata et al. ........... 455/552.1 |
| 2011/0045786 A1 * | 2/2011 | Leinonen et al. ............... 455/78 |

* cited by examiner

Primary Examiner — Nhan Le (57) ABSTRACT

A mobile terminal and a method of operating an antenna thereof are provided. The mobile terminal includes a plurality of antennas.

A resonance frequency moving unit moves a resonance frequency of at least one of the plurality of antennas. And a controller controls the resonance frequency moving unit to sustain or move a resonance frequency of the at least one antenna according to use of a plurality of antennas. Therefore, by minimizing mutual interference occurring between a plurality of antennas using a similar frequency band, a wireless communication performance can be improved.

16 Claims, 6 Drawing Sheets

MOBILE TERMINAL AND METHOD OF OPERATING ANTENNA THEREOF

CROSS-REFERENCE TO RELATED APPLICATION(S) AND CLAIM OF PRIORITY

The present application is related to and claims priority under 35 U.S.C. §119 to an application filed in the Korean Intellectual Property Office on Dec. 7, 2009 and allocated Serial No. 10-2009-0120360, the contents of which are incorporated herein by reference.

TECHNICAL FIELD OF THE INVENTION

The present invention relates to a mobile terminal and a method of operating an antenna thereof and, more particularly, to a mobile terminal and a method of operating an antenna thereof that can minimize a mutual interference phenomenon between a plurality of antennas in a mobile terminal that include the plurality of antennas.

BACKGROUND OF THE INVENTION

Nowadays, with rapid technology development, mobile terminals provide various additional functions such as text message transmitting and receiving functions, image photographing function, music reproduction function, digital broadcasting service function, E-mail service function, instant messenger service function, and short range wireless communication function in addition to an audio dedicated communication function. In order to provide various functions, the mobile terminal mounts a plurality of antennas. The mobile terminal may include, for example, a mobile communication antenna, a digital broadcasting receiving antenna, and a short range wireless communication antenna. When the antennas have a similar resonance frequency, a mutual interference phenomenon may occur.

Furthermore, as mobile communication technology develops, a data transmitting speed remarkably increases, and thus a fading phenomenon occurs, thereby deteriorating a reception performance.

The fading phenomenon is a phenomenon in which a reception performance is deteriorated because a receiving electric field is not constant due to multi-path noise of transmitted electric waves.

In order to solve a reception phenomenon deterioration problem due to such a fading phenomenon, mobile terminals including a diversity antenna increase. In a small-sized mobile terminal, a limitation exists in securing a physical distance between antennas for forming a diversity antenna. In a conventional mobile terminal, when a plurality of antennas that use the same or similar frequency band are mounted, a wireless communication performance of the mobile terminal may be deteriorated due to mutual interference between antennas.

SUMMARY OF THE INVENTION

To address the above-discussed deficiencies of the prior art, it is a primary object to provide a mobile terminal and a method of operating an antenna thereof that can improve a wireless communication performance by minimizing mutual interference between a plurality of antennas.

The present invention further provides a mobile terminal and a method of operating an antenna thereof that can reduce mutual interference between a plurality of antennas in a mobile terminal that include a diversity antenna using the plurality of antennas.

In accordance with an aspect of the present invention, a mobile terminal includes a plurality of antennas. A resonance frequency moving unit moves a resonance frequency of at least one of the plurality of antennas. And a controller controls the resonance frequency moving unit to sustain or move a resonance frequency of at least one antenna according to use of the plurality of antennas.

In accordance with another aspect of the present invention, a method of operating an antenna of a mobile terminal including a plurality of antennas is provided. The method includes determining whether use of at least one specific antenna of the plurality of antennas is requested. If use of the at least one specific antenna is requested, a resonance frequency of the at least one specific antenna is sustained, and a resonance frequency of another antenna in which use is not requested is moved to other frequency areas.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure.

Those skilled in the art will understand that the principles of the present disclosure may be implemented in any suitably arranged wireless communication device. The views in the drawings are schematic views only, and are not intended to be to scale or correctly proportioned. Detailed descriptions of well-known functions and structures incorporated herein may be omitted to avoid obscuring the subject matter of the present invention.

While the present invention may be embodied in many different forms, specific embodiments of the present invention are shown in drawings and are described in detail, with the understanding that the present disclosure is to be considered as an exemplification of the principles of the invention and is not intended to limit the invention to the specific embodiments illustrated.

Figure 1:
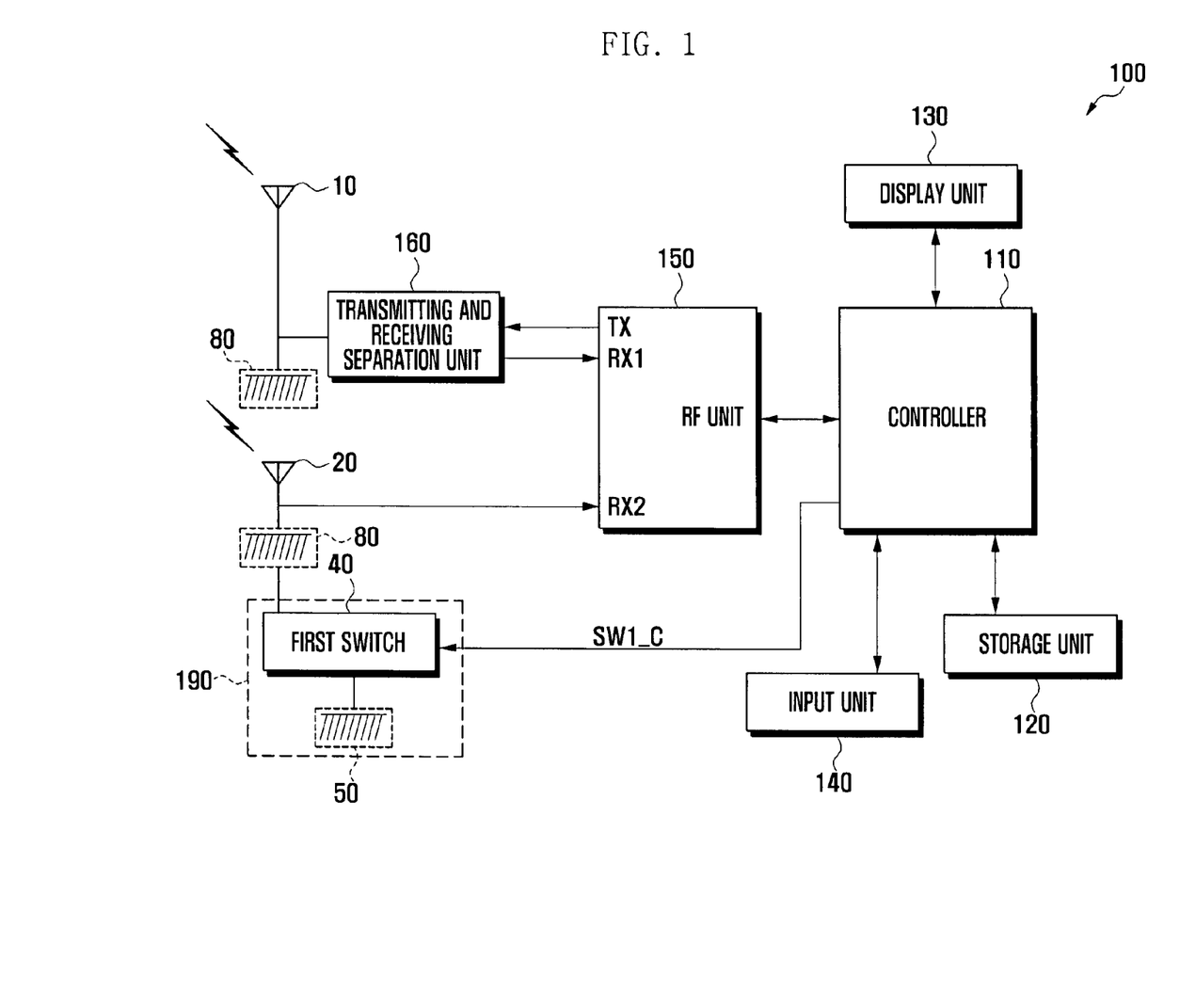
FIG. 1 illustrates a configuration of a mobile terminal according to an embodiment of the present invention.
Figure 2:
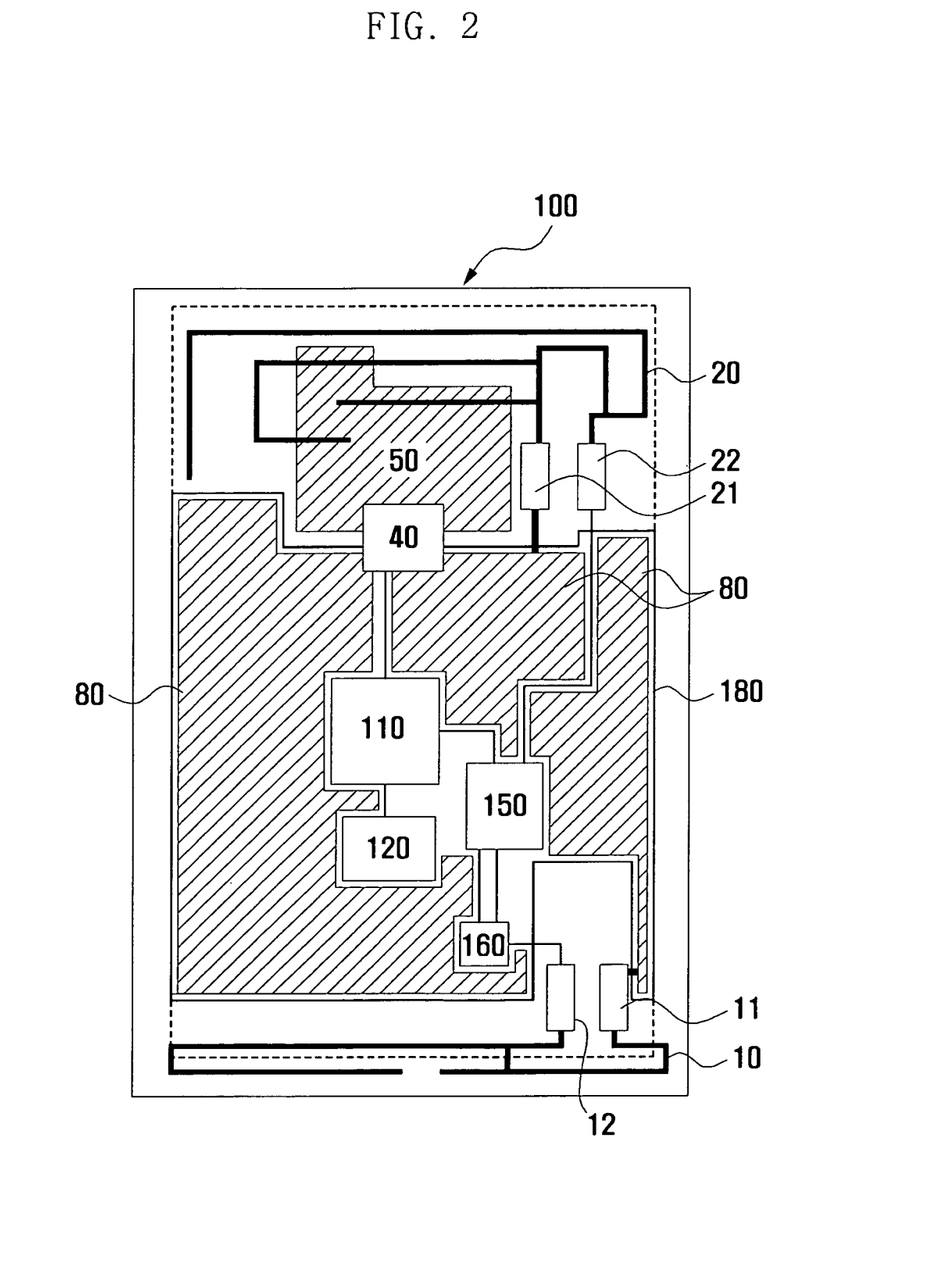
FIG. 2 illustrates an internal structure of the mobile terminal of FIG. 1.

FIG. 1 illustrates a configuration of a mobile terminal 100 according to an embodiment of the present invention, and FIG. 2 is a diagram illustrating an internal structure of the mobile terminal 100 of FIG. 1.

Referring to FIGS. 1 and 2, the mobile terminal 100 according to an embodiment includes a controller 110, storage unit 120, display unit 130, input unit 140, radio frequency (RF) unit 150, transmitting and receiving separation unit 160, printed circuit board (PCB) 180, resonance frequency moving unit 190, first antenna 10, second antenna 20, and main ground 80. The resonance frequency moving unit 190 includes a first switch 40 and a first sub-ground 50.

The input unit 140 is used to input numerals or various character information and includes input keys and function keys for setting and controlling various functions of the mobile terminal 100. The input unit 140 may include, for example, a communication key for requesting audio dedicated communication, an audiovisual communication key for requesting audiovisual communication, a volume key for adjusting an output volume of an audio signal, and a broadcasting key for reproducing digital broadcasting. The input unit 140 is formed as one or a combination of input devices such as a touch-pad, a touch-screen, a general key array of button type keypad, and a QWERTY button type keypad according to a form of the mobile terminal 100.

The display unit 130 displays various menu screens of the mobile terminal 100, user data input by a user, and function setting information or other various information provided to a user. For example, the display unit 130 may output a booting screen, a standby screen, a menu screen, and an audiovisual communication screen. The display unit 130 may be formed as a liquid crystal display (LCD), an organic light emitting diode (OLED), or an active matrix organic light emitting diode (AMOLED). When the display unit 130 is formed as a touch screen, the display unit 130 can be operated as the input unit 140.

The transmitting and receiving separation unit 160 separates a receiving signal received from the first antenna 10 and a transmitting signal transmitted from the RF unit 150. The transmitting and receiving separation unit 160 may be formed as a duplexer, a switch, or a diplexer according to a communication method.

The RF unit 150 transmits and receives a wireless signal to and from a mobile communication network (base station) and includes an RF transmitting unit (not shown) for up-converting a frequency of a transmitting signal received from the controller 110 and amplifying the signal and an RF receiving unit (not shown) for low-noise amplifying a receiving signal input from at least one of the first antenna 10 and the second antenna 20, and down-converting a frequency of the signal. That is, the RF unit 150 includes a transmitting terminal TX for transmitting a transmission signal to the transmitting and receiving separation unit 160, a first receiving terminal RX1 for receiving a receiving signal, in which the first antenna 10 receives, through the transmitting and receiving separation unit 160, and a second receiving terminal RX2 for receiving a receiving signal from the second antenna 20.

The PCB 180 is mounted within the mobile terminal 100 and may include at least one electronic component such as an integrated circuit (IC), a resistor, a switch, a capacitor, and/or an inductor.

The PCB 180 includes a plurality of metal layers and a plurality of insulation layers for separating the metal layers. The plurality of metal layers are connected with a Metal hole for connecting at least two metal layers. As shown in FIG. 2, the PCB 180 is divided into an area in which the first antenna 10 is positioned, an area in which electronic components are mounted and in which the main ground 80 is formed, and an area at which the second antenna 20 is positioned. In an embodiment, the PCB 180 includes a first sub-ground 50 separated from the main ground 80 in a position area of the second antenna 20 and positioned at a lower end of the second antenna 20.

In FIG. 2, the main ground 80 is illustrated as being divided into a plurality portions; however, the main ground 80 may actually be connected as one.

The first antenna 10 and the second antenna 20 are antennas for a mobile communication service. For example, the first antenna 10 and the second antenna 20 may be a diversity antenna for operating in the same frequency band. The first antenna 10 is a main antenna for transmitting or receiving a wireless signal, and the second antenna 20 is a sub-antenna for receiving a wireless signal.

The diversity antenna can improve a reception performance by selecting a signal with strong reception intensity among signals received from a plurality of antennas, or by synchronizing and synthesizing a plurality of signals. The diversity antenna may use a space diversity method, time diversity method, polarization diversity method, and frequency diversity method. The diversity method is well known, and therefore a detailed description thereof is omitted.

The first antenna 10 and the second antenna 20 request a physical separation distance (e.g. 10λ) in order to reduce mutual interference. Therefore, the first antenna 10 and the second antenna 20 are positioned at an upper side and a lower side of the mobile terminal 100, respectively, as shown in FIG. 2. The first antenna 10 and the second antenna 20 are formed in a Planar Inverted-F Antenna (PIFA) type. That is, the first antenna 10 and the second antenna 20 include feeding terminals 12 and 22 for transmitting a signal and ground terminals 11 and 21, respectively, connected to the main ground 80. However, the first antenna 10 and the second antenna 20 according to the present embodiment are not limited to a PIFA type antenna. In the present embodiment, the first antenna 10 transmits and receives a wireless signal of a code division multiple access (CDMA) method of 800 MHz band, and the second antenna 20 receives a wireless signal of a CDMA method of 800 MHz band.

The resonance frequency moving unit 190 moves a resonance frequency of the second antenna 20. The resonance frequency moving unit 190 includes a first switch 40 and a first sub-ground 50. Although in FIGS. 1 and 2, the mobile terminal 100 according to an embodiment includes a resonance frequency moving unit 190 for moving a resonance frequency of the second antenna 20, the present invention is not limited thereto. For example, the mobile terminal 100 may include a plurality of resonance frequency moving units 190 in order to move a resonance frequency of the first antenna 10 and the second antenna 20, i.e. a plurality of antennas.

The first switch 40 connects or separates the main ground 80 and the first sub-ground 50 included in the PCB 180 according to a first control signal SW1_C of the controller 110. Specifically, the first switch 40 is activated in an idle state to connect the first sub-ground 50 and the main ground 80, and when a traffic channel is formed, the first switch 40 is deactivated to separate the first sub-ground 50 and the main ground 80.

The first sub-ground 50 is positioned at a position adjacent to the second antenna 20, for example at a lower end of the second antenna 20, as shown in FIG. 2. The first sub-ground 50 is separated from the main ground 80. When the first sub-ground 50 is connected to the main ground 80 by the first switch 40, the first sub-ground 50 becomes an element for moving a resonance frequency of the second antenna 20. This is because the main ground 80 and the first sub-ground 50 are connected and thus a ground area connected to the ground terminal 21 of the second antenna 20 is extended. That is, the first sub-ground 50 is connected to the main ground 80 to operate as a constituent element of the second antenna 20. As such, when the second antenna 20 is not used (for example, when the second antenna 20 is in an idle state), by moving a resonance frequency of the second antenna 20 by connecting the first sub-ground 50 and the main ground 80, the second antenna 20 can reduce interference in the first antenna 10. Thereby, in an idle state, a wireless communication performance of the mobile terminal 100 can be improved. It is preferable that a size and shape of the first sub-ground 50 are designed in consideration of reception performance deterioration of the first antenna 10 due to separation of the main ground 80 and the first sub-ground 50, or a moving degree of a resonance frequency of the second antenna 20 due to a connection of the main ground 80 and the first sub-ground 50. In other words, deterioration in reception performance of the first antenna 10 when the first sub-ground 50 and the main ground 80 are separated is minimized, and when the main ground 80 and the first sub-ground 50 are connected, in order to minimize interference of the second antenna 20 that influences the first antenna 10, it is preferable to adjust a size and shape of the first sub-ground 50.

The storage unit 120 stores an application program necessary for an operating system (OS) and other optional functions such as a sound reproduction function, image or moving picture reproduction function, and broadcasting reproduction function of the mobile terminal 100 according to an embodiment. The storage unit 120 stores user data, and data transmitted and received when performing communication. In an embodiment, the storage unit 120 stores a program for controlling activation of the first switch 40 according to a present state of the mobile terminal 100. A detailed operation thereof is described later in a description of the controller 110.

The controller 110 controls general operations of the mobile terminal 100 and signal flow between units of the mobile terminal 100, and has a function of a data processor for processing data transmitted and received through the RF unit 150. When the first antenna 10 and the second antenna 20 are formed as a diversity antenna, the controller 110 operates only the first antenna 10 in an idle state in consideration of current consumption, and when a traffic channel is formed, the controller 110 uses a diversity method by operating the first antenna 10 and the second antenna 20. Alternatively, the controller 110 may operate the second antenna 20 only when forming a packet data communication channel of a high speed according to the intent of a designer or a provider.

When both the first antenna 10 and the second antenna 20 operate, i.e. when both the first antenna 10 and the second antenna 20 are in an active state, reception ability of the mobile terminal 100 can be improved. However, when the second antenna 20 does not operate (for example, when the second antenna 20 is in an idle state), a reception performance of the mobile terminal 100 is deteriorated.

Particularly, when a physical distance of the first antenna 10 and the second antenna 20 is not fully secured, a reception performance of the mobile terminal 100 may be further deteriorated. This is because the second antenna 20 resonates even while in a passive state.

In order to prevent a problem that a reception performance is deteriorated in an idle state, the controller 110 may control activation of the first switch 40 according to whether the second antenna 20 is being used. For example, in an idle state in which the second antenna 20 is not used, the controller 110 can improve a reception performance of the first antenna 10 by moving a resonance frequency of the second antenna 20 by activating the first switch 40, i.e. by connecting the first sub-ground 50 and the main ground 80.

When a traffic channel is formed, i.e. when a use of the second antenna 20 is requested, the controller 110 controls the second antenna 20 to resonate in an original resonance frequency by separating the first sub-ground 50 and the main ground 80 by deactivating the first switch 40. That is, when the traffic channel is formed, the controller 110 forms a diversity antenna by activating the first antenna 10 and the second antenna 20. Here, the traffic channel formation may be an audio dedicated communication connection or an audiovisual communication connection and packet data communication channel connection. The controller 110 may deactivate the first switch 40 only when a packet data communication channel is formed according to a provider's intent.

Although in the foregoing description, the mobile terminal 100 according to the present embodiment includes two antennas 10 and 20, and the two antennas 10 and 20 are formed as a diversity antenna, the present invention is not limited thereto. That is, the present invention can be applied when forming a diversity antenna using three or more antennas and to mobile terminals including two or more antennas using a similar frequency band.

Although not shown, the mobile terminal 100 may further include constituent elements that support additional functions, such as a short range communication module for short range wireless communication, a digital sound source reproduction module such as a Moving Picture Experts Group layer-3 (MP3) module, an Internet communication module for performing an Internet function, and/or a camera module for photographing a still image or a moving picture.

Figure 3:
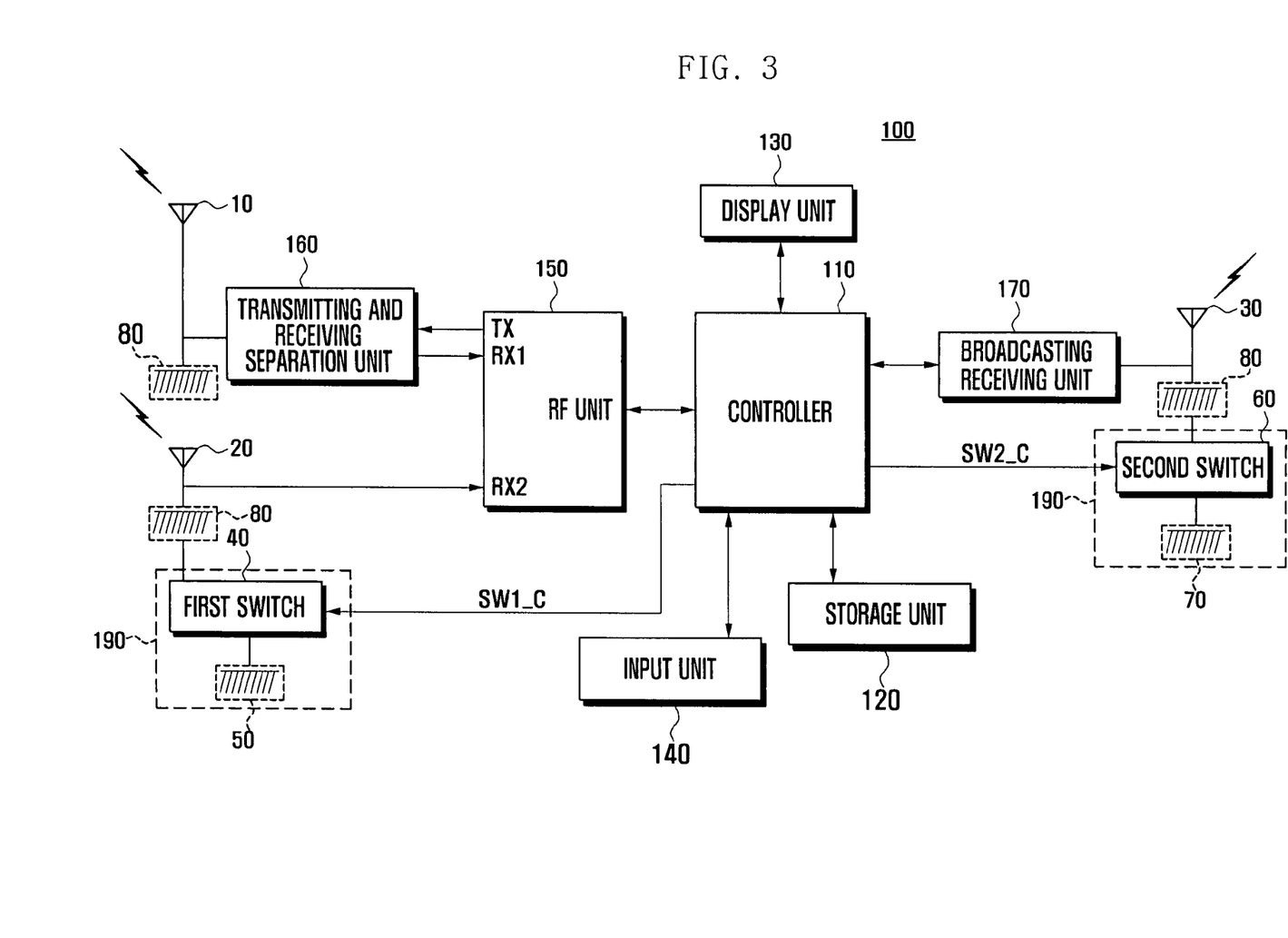
FIG. 3 illustrates a configuration of a mobile terminal according to an embodiment of the present invention.
Figure 4:
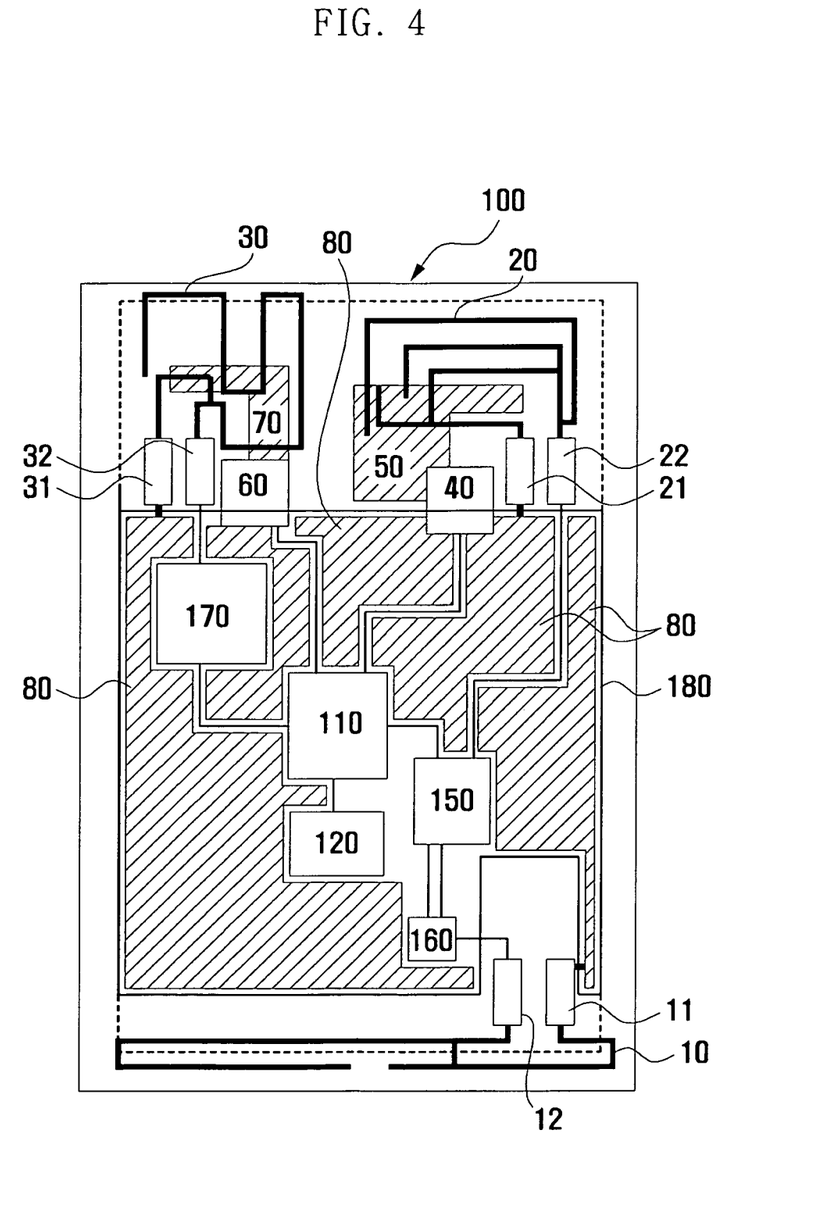
FIG. 4 illustrates an internal structure of the mobile terminal of FIG. 3.

FIG. 3 illustrates a configuration of a mobile terminal 100 according to an embodiment of the present invention, and FIG. 4 illustrates an internal structure of the mobile terminal 100 of FIG. 3.

Referring to FIGS. 3 and 4, the mobile terminal 100 according to the present embodiment includes a controller 110, storage unit 120, display unit 130, input unit 140, RF unit 150, transmitting and receiving separation unit 160, broadcasting receiving unit 170, PCB 180, resonance frequency moving unit 190, first antenna 10, second antenna 20, third antenna 30, and main ground 80. The resonance frequency moving unit 190 includes a first switch 40, first sub-ground 50, second switch 60, and second sub-ground 70.

When describing an embodiment of the present invention, for convenience of description, a configuration similar to that of FIGS. 1 and 2 is omitted.

When digital broadcasting reproduction is requested and the broadcasting receiving unit 170 is activated, the broadcasting receiving unit 170 low-noise amplifies a digital broadcasting signal received through the third antenna 30, down-converts a frequency thereof, and outputs the signal to the controller 110. The third antenna 30 receives digital broadcasting. As shown in FIG. 4, the third antenna 30 is positioned adjacent to the second antenna 20. This is because the third antenna 30 minimizes an influence on the first antenna 10 while in an idle state by securing a physical separation distance when the third antenna 30 uses a frequency band similar to the first antenna 10. The third antenna 30 receives a digital broadcasting signal of a MediaFLO method of 700 MHz band. The third antenna 30 is formed in a PIFA type antenna such as the first antenna 10 and the second antenna 20 and includes a ground terminal 31 and a feeding terminal 32. However, the third antenna 30 according to the present embodiment is not limited to a PIFA type antenna.

The resonance frequency moving unit 190 moves a resonance frequency of the second antenna 20 and the third antenna 30. The resonance frequency moving unit 190 includes a first switch 40, first sub-ground 50, second switch 60, and second sub-ground 70. A description of the first switch 40 and the first sub-ground 50 has been described with reference to FIGS. 1 and 2 and, therefore, is omitted.

The second switch 60 connects or separates the main ground 80 and the second sub-ground 70 according to a second control signal SW2_C of the controller 110. Specifically, when digital broadcasting reproduction is requested, the second switch 60 is deactivated to separate the second sub-ground 70 and the main ground 80. When an idle state or a traffic channel is formed, the second switch 60 is activated to connect the second sub-ground 70 and the main ground 80. When the third antenna 30 does not have an influence on the first antenna 10, the second switch 60 is deactivated while in an idle state.

The second sub-ground 70 is positioned adjacent to the third antenna 30 (for example at a lower end of the third antenna 30), as shown in FIG. 4. The second sub-ground 70 is separated from the main ground 80 and the first sub-ground 50. When the second sub-ground 70 is connected to the main ground 80 by the second switch 60, the second sub-ground 70 may become an element for moving a resonance frequency of the third antenna 30. This is because the main ground 80 and the second sub-ground 70 are connected and thus a ground area connected to the ground terminal 31 of the third antenna 30 is extended. That is, the second sub-ground 70 is connected to the main ground 80 to operate as a constituent element of the third antenna 30. In this way, when the third antenna 30 is not used (for example, when an idle state or a traffic channel is formed), by moving a resonance frequency of the third antenna 30 by connecting the second sub-ground 70 to the main ground 80, the third antenna 30 can minimize interference in the first antenna 10 and the second antenna 20. When the third antenna 30 does not cause interference in the first antenna 10, the second sub-ground 70 may not be connected to the main ground 80 in an idle state. When a request for reproduction of a digital broadcasting signal is input, the second sub-ground 70 is separated from the main ground 80.

The storage unit 120 stores an application program necessary for an OS and other optional functions such as a sound reproduction function, image or moving picture reproduction function, and broadcasting reproduction function of the mobile terminal 100 according to the present embodiment.

The storage unit 120 stores user data, and data transmitted and received when performing communication. In an embodiment, the storage unit 120 stores a program for controlling activation of the first switch 40 and the second switch 60 according to a present state of the mobile terminal 100. A detailed operation thereof is described later in a description of the controller 110.

The controller 110 controls general operations of the mobile terminal 100 and signal flow between units of the mobile terminal 100 and has a function of a data processor for processing data transmitted and received through the RF unit 150. In an embodiment, the controller 110 controls whether to activate the first switch 40 and the second switch 60 according to use of the first antenna 10, second antenna 20, and the third antenna 30. For example, in an idle state, the controller 110 activates the first switch 40 in order to improve a reception performance of the first antenna 10 and moves a resonance frequency of the second antenna 20 by connecting the first sub-ground 50 and the main ground 80. Further, when the third antenna 30 has a resonance frequency of a similar band that can interfere in the first antenna 10, the controller 110 activates the second switch 60 to connect the second sub-ground 70 and the main ground 80, thereby moving a resonance frequency of the third antenna 30. Alternatively, when the third antenna 30 does not interfere in the first antenna 10, the controller 110 deactivates the second switch 60 and controls to separate the second sub-ground 70 and the main ground 80.

When a traffic channel is formed, i.e. when a use of the second antenna 20 is requested, the controller 110 activates the first antenna 10 and the second antenna 20 to operate as a diversity antenna. That is, the controller 110 deactivates the first switch 40 to separate the first sub-ground 50 and the main ground 80, thereby controlling the second antenna 20 to resonate in an original resonance frequency. In order to connect the second sub-ground 70 and the main ground 80, the controller 110 activates the second switch 60.

The traffic channel formation may include audio dedicated communication connection or audiovisual communication connection and packet data communication channel connection. Only when a packet data communication channel forms, the controller 110 may control to deactivate the first switch 40 according to a provider's intent.

When digital broadcasting reproduction is requested, the controller 110 deactivates the second switch 60 to separate the second sub-ground 70 and the main ground 80 and activates the first switch 40 to connect the first sub-ground 50 and the main ground 80.

Although not shown, the mobile terminal 100 further may include constituent elements that support additional functions, such as a short range communication module for short range wireless communication, digital sound source reproduction module such as an MP3 module, Internet communication module for performing an Internet function, and camera module for photographing a still image or a moving picture.

Figure 5:
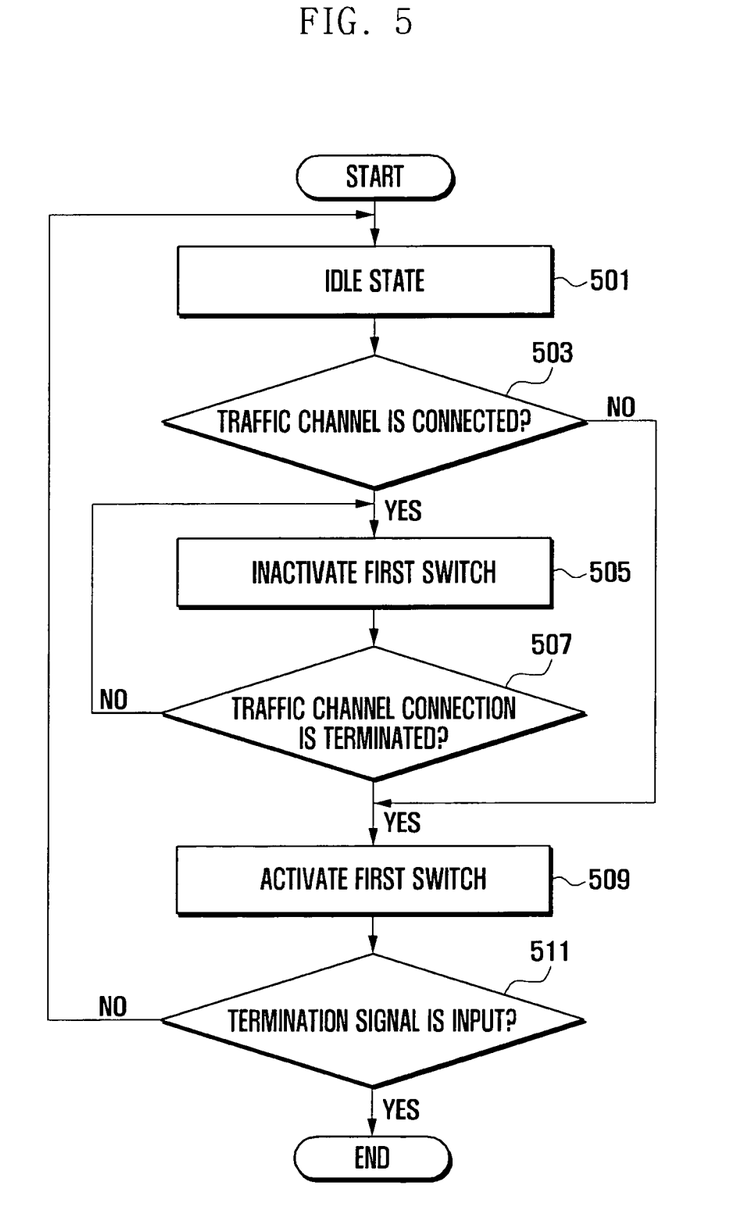
FIG. 5 illustrates a process of operating an antenna of the mobile terminal of FIG. 1.

FIG. 5 illustrates a process of operating an antenna of the mobile terminal 100 of FIG. 1.

Referring to FIGS. 1, 2, and 5, the mobile terminal 100 is in an idle state after booting is complete (block 501).

The controller 110 determines whether a traffic channel is connected (block 503). The traffic channel connection includes audio dedicated communication channel connection, audiovisual communication channel connection, and packet data communication channel connection.

If a traffic channel is not connected, the process continues at block 509.

If a traffic channel is connected, the controller 110 deactivates the first switch 40 (block 505).

That is, the controller 110 transmits a control signal for deactivating the first switch 40 to a control terminal (not shown) of the first switch 40. When the first switch 40 is deactivated, the main ground 80 and the first sub-ground 50 are separated. The first antenna 10 and the second antenna 20 have the same resonance frequency and operate as a diversity antenna. Therefore, when a traffic channel is formed, a reception performance of the mobile terminal 100 can be improved.

The controller 110 determines whether the traffic channel connection is terminated (block 507).

If the traffic channel connection is not terminated, the process returns to block 505.

If the traffic channel connection is terminated, the controller 110 activates the first switch 40 (block 509). That is, the controller 110 transmits a control signal for activating the first switch 40 to a control terminal (not shown) of the first switch 40. When the first switch 40 is activated, the main ground 80 and the first sub-ground 50 are connected. A resonance frequency of the second antenna 20 is moved to another frequency area that does not interfere in a resonance frequency of the first antenna 10. Therefore, in a state in which a traffic channel is not connected, for example in an idle state, a wireless communication performance of the first antenna 10 can be improved.

The controller 110 determines whether a termination signal is input (block 511).

If a termination signal is input, the controller 110 turns off power of the mobile terminal 100.

If a termination signal is not input, the process returns to block 501 and the above-described process is repeated. That is, until a termination signal is input, the controller 110 repeats a process of controlling activation of the first switch 40 according to whether a traffic channel is connected.

A process of deactivating the first switch 40 when a traffic channel is connected is described; however, the controller 110 may deactivate the first switch 40 only when the packet data communication channel is connected according to an intent of a mobile communication provider or a mobile terminal designer.

Figure 6:
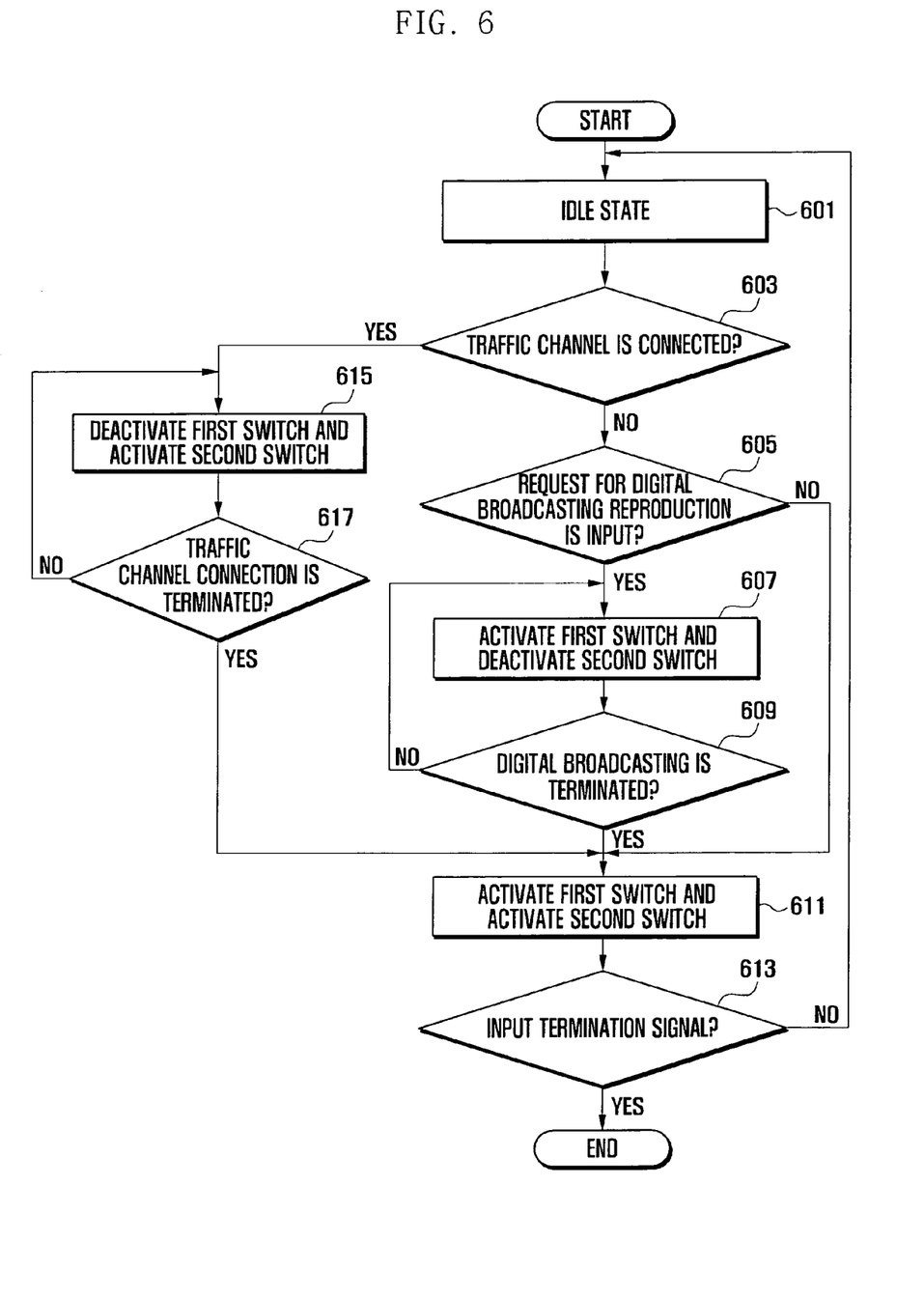
FIG. 6 illustrates a process of operating an antenna of the mobile terminal of FIG. 3.

FIG. 6 illustrates a method of operating an antenna of the mobile terminal 100 of FIG. 3.

Referring to FIGS. 3, 4, and 6, the mobile terminal 100 is in an idle state after booting is complete (block 601).

The controller 110 determines whether a traffic channel is connected (block 603). The traffic channel connection includes audio dedicated communication channel connection, audiovisual communication channel connection, and packet data communication channel connection.

If a traffic channel is connected, the controller 110 deactivates the first switch 40 and activates the second switch 60 (block 615). That is, when the traffic channel is connected, the controller 110 controls the first antenna 10 and the second antenna 20 to operate as a diversity antenna by separating the main ground 80 and the first sub-ground 50 and moves a resonance frequency of the third antenna 30 to another frequency area by connecting the main ground 80 and the second sub-ground 70. This is to reduce interference in which the third antenna 30 has an influence on the second antenna 20.

The controller 110 determines whether the traffic channel connection is terminated (block 617).

If the traffic channel connection is not terminated, the process returns to block 615.

If the traffic channel connection is terminated, the process continues at block 611.

If a traffic channel is not connected at block 603, the controller 110 determines whether a request for digital broadcasting reproduction is input (block 605).

If a request for digital broadcasting reproduction is not input, the process continues at block 611.

If a request for digital broadcasting reproduction is input, the controller 110 activates the first switch 40 and deactivates the second switch 60 (block 607). That is, the controller 110 transmits a control signal for activating the first switch 40 to a control terminal (not shown) of the first switch 40 and transmits a control signal for deactivating the second switch 60 to a control terminal (not shown) of the second switch 60. That is, the first sub-ground 50 is connected to the main ground 80, and the second sub-ground 70 is separated from the main ground 80.

The controller 110 determines whether digital broadcasting is terminated (block 609).

If digital broadcasting is not terminated, the process returns to block 607.

If digital broadcasting is terminated, the controller 110 activates the first switch 40 and activates the second switch 60 (block 611).

When the first switch 40 and the second switch 60 are activated, the first sub-ground 50 and the second sub-ground 70 are each connected to the main ground 80. That is, a resonance frequency of the first antenna 10 and the second antenna 20 is moved to another frequency area that does not interfere with the first antenna 10.

Therefore, in a state in which a traffic channel is not connected (for example in an idle state), a wireless communication performance of the first antenna 10 can be improved.

In an embodiment, when the third antenna 30 does not interfere in the first antenna 10, the controller 110 may control the second switch 60 to be in a deactivated state at block 611.

As a communication request is received from another mobile terminal at block 609, when digital broadcasting is terminated, the process continues at block 615.

The controller 110 determines whether a termination signal is input (block 613).

If a termination signal is input, the controller 110 turns off power of the mobile terminal 100.

If a termination signal is not input, the process returns to block 601 and the above-described process is repeated. That is, until a termination signal is input, the controller 110 repeats a process of controlling activation of the first switch 40 and the second switch 60 according to a traffic channel connection or a digital broadcasting reproduction request.

In the foregoing description, a process of deactivating the first switch 40 when a traffic channel is connected is described; however, the controller 110 may deactivate the first switch 40 only when the packet data communication channel is connected according to an intent of a mobile communication provider or a mobile terminal designer.

In short, in a method of operating an antenna of a mobile terminal according to an embodiment of the present invention, it is determined whether use of at least one specific antenna of a plurality of antennas is requested, and when use of the at least one specific antenna is requested, a resonance frequency of the at least one specific antenna in which use is requested is sustained and a resonance frequency of another antenna in which use is not requested is moved to another frequency area.

In the above description, by connecting a sub-ground and a main ground, a resonance frequency of an antenna is moved, however the present invention is not limited thereto. For example, when a main ground and a sub-ground are separated, a resonance frequency of an antenna may be moved.

Further, conventional problems can be solved and a purpose of the present invention can be achieved through various methods of moving a resonance frequency of an antenna, which may not require a connection/separation of a sub-ground to a person of ordinary skill in the art.

As described above, according to the present invention, a mobile terminal and a method of operating an antenna thereof can improve a wireless communication performance of the mobile terminal by minimizing mutual.interference between a plurality of antennas.

Further, in a small-sized mobile terminal in which it is difficult to secure a physical separation distance between antennas, a wireless communication performance can be improved and thus can overcome design restriction due to deterioration of a wireless communication performance.

Although the present disclosure has been described with embodiments, various changes and modifications may be suggested to one skilled in the art. It is intended that the present disclosure encompass such changes and modifications as fall within the scope of the appended claims.

What is claimed is:

1. A mobile terminal comprising:
    a plurality of antennas;
    a main ground;
    at least one sub-ground separate from the main ground and positioned adjacent to a corresponding antenna among the plurality of antennas;
    at least one switch configured to switch a connection of the main ground and the at least one sub-ground; and
    a controller configured to sustain or move a resonance frequency of the corresponding antenna by controlling switching of the connection of the main ground and the at least one sub-ground,
    wherein the plurality of antennas comprise:
        a first antenna disposed at one side of a printed circuit board (PCB) including at least one electronic component and the main ground, the first antenna being a main antenna configured to transmit and receive a wireless signal,
        a second antenna disposed at another side of the PCB, the second antenna being a sub-antenna configured to receive a wireless signal transmitted from a base station, and
        a third antenna configured to receive a digital broadcasting signal; and
    wherein:
        the first antenna and the second antenna are formed as a diversity antenna for mobile communication,
        at least one second sub-ground is positioned adjacent to the third antenna and separate from the main ground and the at least one sub-ground, and
        at least one second switch is configured to switch a connection of the main ground and the at least one second sub-ground according to a control signal of the controller.

2. The mobile terminal of claim 1, wherein:
    the at least one sub-ground is positioned adjacent to the second antenna and separate from the main ground; and
    the at least one switch is configured to switch a connection of one of the at least one sub-ground and the main ground according to a control signal of the controller.

3. The mobile terminal of claim 2, further comprising the controller configured to activate the at least one switch to connect the main ground and the at least one sub-ground when the second antenna is not used.

4. The mobile terminal of claim 2, further comprising the controller configured to deactivate the at least one switch to separate the main ground and the at least one sub-ground when use of the second antenna is requested.

5. The mobile terminal of claim 1, further comprising the controller configured to activate the at least one switch to connect the main ground and the at least one sub-ground and activate the at least one second switch to connect the main ground and the at least one second sub-ground when a traffic channel is not formed.

6. The mobile terminal of claim 1, further comprising the controller configured to activate the at least one switch to connect the main ground and the at least one sub-ground and deactivate the at least one second switch to separate the main ground and the at least one second sub-ground when a traffic channel is not formed.

7. The mobile terminal of claim 1, further comprising the controller configured to deactivate the at least one switch to separate the main ground and the at least one sub-ground and activate the at least one second switch to connect the main ground and the at least one second sub-ground when a traffic channel is formed.

8. The mobile terminal of claim 7, wherein the controller is configured to determine that the traffic channel is formed when a packet data communication channel is formed.

9. The mobile terminal of claim 1, wherein the controller is configured to activate the at least one switch to connect the main ground and the at least one sub-ground and deactivate the at least one second switch to separate the main ground and the at least one second sub-ground when a reproduction of a digital broadcasting signal is requested.

10. A method of operating an antenna of a mobile terminal comprising a plurality of antennas, the method comprising:
    communicating through at least one first antenna of the plurality of antennas, the at least one first antenna disposed at one side of a printed circuit board (PCB) including at least one electronic component and a main ground, the at least one first antenna being a main antenna configured to transmit and receive a wireless signal;
    determining whether use of at least one second antenna of the plurality of antennas is requested, the at least one second antenna disposed at another side of the PCB, the at least one second antenna being a sub-antenna configured to receive a wireless signal transmitted from a base station;
    moving or sustaining a resonance frequency of the at least one second antenna by controlling a first switch to switch a connection of a main ground and a first sub-ground based on the determination, the first sub-ground being separated from the main ground and positioned adjacent to the at least one second antenna; and
    switching a connection of the main ground and a second sub-ground according to a control signal using a second switch, the second sub-ground being positioned adjacent to a third antenna for receiving a digital broadcasting signal and separate from the main ground and the first sub-ground,
    wherein the at least one first antenna and the at least one second antenna are formed as a diversity antenna for mobile communication.

11. The method of claim 10, wherein moving or sustaining the resonance frequency further comprises separating, when use of the at least one second antenna is requested, the main ground from the first sub-ground.

12. The method of claim 11, wherein separating comprises deactivating the first switch to separate the main ground from the first sub-ground.

13. The method of claim 11, further comprising:
in response to a reproduction of a digital broadcasting signal being requested on the at least one first antenna, connecting the main ground and the first sub-ground, and sustaining the connection of the main ground and the first sub-ground.

14. The method of claim 10, wherein moving or sustaining the resonance frequency comprises connecting, when use of the at least one second antenna is not requested the main ground and the first sub-ground.

15. The method of claim 14, wherein connecting comprises activating the first switch to connect the main ground and the first sub-ground.

16. The method of claim 10, wherein determining comprises determining, when a traffic channel is formed, that use of the at least one second antenna of the plurality of antennas is requested.

* * * * *